UNITED STATES PATENT OFFICE.

R. F. H. HAVEMANN, OF NEW BRUNSWICK, NEW JERSEY.

IMPROVEMENT IN COMPOSITIONS OF CAOUTCHOUC.

Specification forming part of Letters Patent No. 31,240, dated January 29, 1861.

*To all whom it may concern:*

Be it known that I, RUDOLPH F. H. HAVEMANN, of New Brunswick, in the county of Middlesex and State of New Jersey, have invented a new and useful Improvement in Compounds of India-Rubber, Gutta-Percha, or their Allied Gums; and I do hereby declare that the following is a full, clear, and exact description of the same.

My invention relates to the production of compounds of india-rubber, gutta-percha, or their allied gums of a texture and appearance resembling ivory or bone. Previous attempts to produce such compounds have been only partially successful. A hard white substance is produced by the process described in the schedule of Letters Patent granted to G. A. Englehard and myself, dated November 22, 1859; but this takes a very long time to harden, and when hardened is too brittle and porous to be of much practical value.

My invention consists in the production of a new compound, forming a more perfect substitute for ivory and bone, and which is sooner ready for use, by the admixture of oxide of zinc with chlorine rubber compound produced as described in the Letters Patent above mentioned.

The treatment of the gum with chlorine may be effected by either of the two processes specified in those Letters Patent; but I prefer to use that process in which the gum is reduced to a solution before being subjected to the action of chlorine. When the gum has been reduced to a solution and afterward treated with chlorine, or has been treated with chlorine and afterward reduced to a solution, and before the solvent is extracted, I place it in a mortar or other suitable vessel and add to it a quantity of oxide of zinc, which may be varied to a considerable extent, according to the purpose for which the compound is to be used or the degree of hardness required, the hardness and whiteness being greater or less, and the toughness less or greater in proportion to the quantity of this mineral matter that is used. I propose generally to use one part, by weight, of the oxide of zinc for every two parts of gum. I then grind or stir the substances together till they are perfectly incorporated, when they form a soft jelly-like mass, after which I add a quantity of alcohol, and stir the whole well together till the solvent which has been employed is completely extracted and caused to combine with the alcohol when the compound of gum chlorine and oxide of zinc precipitates or subsides to the bottom of the vessel, and, after decanting or otherwise separating the liquor, (alcohol and solvent,) I place the said compound between cold plates or dies of zinc in a press and subject it to a heavy pressure, which I increase gradually or from time to time till the compound is incapable of greater condensation, when I remove it from the press and expose it to a moderate heat, which may be gradually increased to above the boiling-point of the solvent that has been used, in order to dry it completely. When dry, which will generally be in three or four days, it is perfectly hard and fit for use. Solid slabs of any desired thickness may be obtained by taking a suitable number of thin sheets prepared and dried as above described, covering their surfaces slightly with chloeoform or any other solvent of the gum, and placing them one upon another in a press between two zinc plates heated by steam or by other agency, and pressing them together.

This compound may be colored in various tints by the addition of suitable coloring-matters with the oxide of zinc.

I have in some cases employed finely-powdered bone-dust, and in other cases collodion, and in some cases both of these substances in connection with the oxide of zinc and the chlorine, in combination with the gum, without materially altering the product, and with the use of these substances I make a corresponding reduction in the quantity of the oxide of zinc.

I do not claim, broadly, the use of oxide of zinc in india-rubber compounds; but

What I claim as my invention, and desire to secure by Letters Patent, is—

The compound produced by the admixture, in the manner herein shown and described, of oxide of zinc with the within-mentioned patented compound of chlorine-treated rubber or its chlorine-treated allied gums, as set forth.

R. F. H. HAVEMANN.

Witnesses:
O. D. MUNN,
JAMES LAIRD.